(12) United States Patent
Schmidtlein et al.

(10) Patent No.: US 12,445,069 B2
(45) Date of Patent: Oct. 14, 2025

(54) METHOD FOR OPERATING AN ELECTRIC MOTOR, CONTROLLER, PISTON PUMP

(71) Applicant: Robert Bosch GmbH, Stuttgart (DE)

(72) Inventors: Andreas Schmidtlein, Tamm (DE); Christoph Emde, Leingarten (DE)

(73) Assignee: ROBERT BOSCH GMBH, Stuttgart (DE)

( * ) Notice: Subject to any disclaimer, the term of this patent is extended or adjusted under 35 U.S.C. 154(b) by 118 days.

(21) Appl. No.: 18/245,989

(22) PCT Filed: Aug. 11, 2021

(86) PCT No.: PCT/EP2021/072405
§ 371 (c)(1),
(2) Date: Mar. 20, 2023

(87) PCT Pub. No.: WO2022/063481
PCT Pub. Date: Mar. 31, 2022

(65) Prior Publication Data
US 2023/0353070 A1    Nov. 2, 2023

(30) Foreign Application Priority Data
Sep. 24, 2020   (DE) .............. 10 2020 211 994.5

(51) Int. Cl.
*H02P 6/06* (2006.01)
*F04B 17/03* (2006.01)
(Continued)

(52) U.S. Cl.
CPC ............... *H02P 6/06* (2013.01); *F04B 17/03* (2013.01); *H02P 6/30* (2016.02); *B60T 13/745* (2013.01); *B60T 17/02* (2013.01)

(58) Field of Classification Search
CPC .... H02P 6/06; H02P 6/30; F04B 17/03; B60T 13/745; B60T 17/02; B60T 8/4036;
(Continued)

(56) References Cited

U.S. PATENT DOCUMENTS 8,661,884 B2 *  3/2014  Miyazaki .............. B60T 13/662
                                                    73/132
10,562,399 B2    2/2020  Ota
(Continued)

FOREIGN PATENT DOCUMENTS

EP          1826083 A1      8/2007
JP        H03226288 A      10/1991
(Continued)

OTHER PUBLICATIONS

International Search Report for PCT/EP2021/072405, Issued Nov. 23, 2021.

*Primary Examiner* — Essama Omgba
*Assistant Examiner* — Lilya Pekarskaya
(74) *Attorney, Agent, or Firm* — NORTON ROSE FULBRIGHT US LLP

(57) ABSTRACT

A method for operating an electric motor, in particular of a piston pump. The electric motor has a rotor shaft and is actuated with a target rotational speed and a target rotational direction for the rotor shaft as a function of a power demand, wherein an actual rotational speed of the rotor shaft is monitored. In the method, the target rotational direction is changed for a specified period of time if the actual rotational speed is equal to zero and the target rotational speed is unequal to zero, and the electric motor is then actuated again at the target rotational speed and in the target rotational direction.

4 Claims, 2 Drawing Sheets

(51) Int. Cl.
*H02P 6/30* (2016.01)
*B60T 13/74* (2006.01)
*B60T 17/02* (2006.01)

(58) Field of Classification Search
CPC .......... B60T 8/404; B60T 8/94; B60T 8/4022; B60Y 2400/81
See application file for complete search history.

(56) References Cited

U.S. PATENT DOCUMENTS

| | | | | |
|---|---|---|---|---|
| 2007/0194621 | A1* | 8/2007 | Ishizuka | B60T 8/4063 303/10 |
| 2008/0224533 | A1* | 9/2008 | Nakada | B60T 8/4059 303/10 |
| 2015/0061366 | A1 | 3/2015 | Shimada et al. | |
| 2019/0093616 | A1* | 3/2019 | Klein | F04B 1/0408 |

FOREIGN PATENT DOCUMENTS

| | | | |
|---|---|---|---|
| JP | 2004180399 | A | 6/2004 |
| JP | 2008199737 | A | 8/2008 |
| JP | 2013227878 | A | 11/2013 |

\* cited by examiner

METHOD FOR OPERATING AN ELECTRIC MOTOR, CONTROLLER, PISTON PUMP

FIELD

The present invention relates to a method for operating an electric motor, in particular of a piston pump, wherein the electric motor comprises a rotor shaft and is actuated with a target rotational speed and a target rotational direction for the rotor shaft as a function of a power demand, and wherein an actual rotational speed of the rotor shaft is monitored.

The present invention also relates to a controller for an electric motor and a piston pump.

BACKGROUND INFORMATION

A brake control system, in particular an anti-lock braking system (ABS) or a vehicle dynamics control (electronic stability program ESP), as part of a brake system of a motor vehicle typically comprises at least one piston pump that can be driven by an electric motor. The piston pump can be operated to generate hydraulic pressure in a brake circuit of the brake system. For this purpose, a cam or an eccentric disk is connected in a rotationally fixed manner to a rotor shaft of the electric motor. The cam can in particular be disposed directly on the rotor shaft or connected to the rotor shaft in a rotationally fixed manner via a gearing. The rotor shaft rotates about an axis of rotation. The cam converts the rotational movement of the rotor shaft into a translational movement or longitudinal movement of a piston of the piston pump. The cam abuts the piston such that the cam exerts a compressive force on the piston, as a result of which the displaceably mounted piston is moved in longitudinal direction. This displacement takes place against a spring element and/or a pressure in the brake circuit. The electric motor has to apply a drive torque to overcome a load torque caused by the displacement of the piston against the displacement path-dependent spring force and/or the pressure in the brake circuit. A maximum drive torque that can be provided by the electric motor is typically greater than a maximum load torque. The load torque is maximum once within a revolution of the cam when the maximum displacement of the piston is reached, because here both the displacement path-dependent spring force and the pressure in the brake circuit are maximum. When the rotor shaft is rotated further, the piston moves back in the original direction again because the piston is pressed against the cam by the spring element due to pretension. The electric motor is typically actuated as a function of a power demand to achieve a specific pressure or delivery volume of the piston pump in the brake circuit with a target rotational speed and target rotational direction for the rotor shaft. However, the electric motor may stall if the drive torque of the electric motor is not sufficient to overcome the load torque. This can occur in particular due to a low voltage of the vehicle electrical system which limits the power consumption of the electric motor and thus the maximum drive torque, or a high temperature of a motor winding of the electric motor, which leads to higher electrical resistance, or due to increased friction on the piston. The stalled electric motor cannot meet the power demand or the piston of the piston pump cannot be actuated. A conventional way to overcome such stalling is designing the electric motor with a larger maximum drive torque than would be necessary to overcome the assumed maximum load torque, so that no case in which the electric motor stalls occurs.

SUMMARY

In a method according to an example embodiment of the present invention, the target rotational direction is changed for a specified period of time if the actual rotational speed is equal to zero and the target rotational speed is unequal to zero and the electric motor is then actuated again at the target rotational speed and in the target rotational direction. As is conventional in the related art, the electric motor is initially actuated as a function of a power demand with a target rotational speed and a target rotational direction for the rotor shaft of the electric motor. The actual rotational speed of the rotor shaft is monitored as well. A stalled electric motor is identified by the fact that the actual rotational speed is equal to zero and the target rotational speed is unequal to zero. In order to resolve the stalling of the electric motor, according to the present invention the target rotational direction is changed for the specified period of time when the stalled electric motor is identified, so that the rotor shaft briefly rotates in the opposite direction. After this specified period of time, the electric motor is again actuated at the target rotational speed and in the target rotational direction so that the rotor shaft rotates in the originally specified direction again. The change in the rotational direction is based on the assumption that the electric motor has to overcome a lower load torque when it rotates in the opposite direction than when it rotates in the originally specified direction, and that the demand for drive torque of the electric motor therefore decreases or is at least lower. This assumption is based on the above-described arrangement of the piston on the cam, in which the load torque is maximum once within a revolution of the cam when the maximum displacement of the piston is reached, because here both the displacement path-dependent spring force and the pressure in the brake circuit are maximum. A change in the rotational direction causes the piston to be moved back and the load torque and with it the demand for drive torque of the electric motor decreases. When the electric motor is actuated again in the target rotational direction after the specified period of time, additional kinetic energy resulting from the acceleration is available to overcome the load torque occurring in the target rotational direction from the rotation in the direction of the maximum load torque, by means of which the load torque can then be overcome without having to increase the target torque. The method according to the present invention thus has the advantage that a stalled electric motor is identified and the actuation of the piston is enabled again by suitable control of the electric motor by briefly rotating the rotor shaft of the electric motor in the opposite direction and then again in the target rotational direction. This is achieved without increasing the target torque of the electric motor. There is in particular no need to use an electric motor with a higher maximum torque.

According to a preferred embodiment of the present invention, it is provided that, to actuate the electric motor, a motor winding is energized as a function of an angular position of the rotor shaft, and that an actual angular position of the rotor shaft is detected and provided with an offset for the specified period of time in order to determine the angular position therefrom, wherein the offset is selected such that the rotational direction of the rotor shaft is changed. According to an example embodiment of the present invention, to actuate the electric motor, the motor windings are preferably energized as a function of the angular position of the rotor shaft if the electric motor is an electrically commutated or brushless electric motor. First, the actual angular position of the rotor shaft is acquired. A permanent magnet is in particular attached to the rotor shaft for this purpose, so that an appropriately configured sensor, in particular a Hall effect-based sensor, detects an orientation of a magnetic field of the permanent magnet, from which the actual angular position is ascertained. The angular position used to actuate the electric motor is determined by providing the actual angular position with an offset for the specified period of time, i.e. after a stalled electric motor has been identified. The angular position is therefore the sum of the actual angular position and the offset. This offset is selected such that the rotational direction of the rotor shaft is changed because the motor windings are energized differently than would be the case without the offset. The offset therefore causes the motor windings to be energized such that, in the actual angular position, this results in the rotor shaft briefly rotating in the opposite direction. The rotor shaft is thus brought into a new actual angular position, from which the electric motor has to overcome a lower load torque when the rotational direction is changed again than when it rotates in the originally specified direction. After the specified period of time, the angular position is no longer provided with the offset, so that the angular position corresponds to the actual angular position. Providing the angular position with the offset therefore has the advantage that there is in particular no need to provide a controller configured for actuating the electric motor with a change in the target rotational direction as a parameter; instead, the change is a direct result of the manipulated angular position.

According to another preferred embodiment of the present invention, it is provided that the specified period of time is between 2 and 5 milliseconds. Setting the specified period of time to an interval between 2 and 5 milliseconds advantageously ensures that the electric motor is actuated for a sufficiently long period of time, so that an actual rotation of the rotor shaft in the opposite direction to the original target rotational direction is enabled. The period of time is also advantageously sufficiently short, depending on the rotational speed of the rotor shaft, so that the rotor shaft rotates in the changed target rotational direction in particular for only a specific number of revolutions or a specific part of a revolution. This is particularly advantageous if the load torque to be overcome by the electric motor has at least one maximum within a revolution of the rotor shaft, as is in particular the case when the cam is disposed directly on the rotor shaft.

A controller according to an example embodiment of the present invention for an electric motor is specially designed to carry out the method according to the present invention. This results in the aforementioned advantages. Further preferred features and combinations of features result from the above-described and the disclosure herein.

A piston pump according to an example embodiment of the present invention comprises an electric motor, wherein the electric motor comprises a rotor shaft, wherein the rotor shaft comprises a cam or an eccentric disk, wherein a piston of the piston pump abuts the cam or the eccentric disk such that a rotation of the rotor shaft causes a longitudinal displacement of the piston in axial direction. The piston pump is characterized by the controller according to the present invention. This, too, results in the aforementioned advantages. Further preferred features and combinations of features result from the above-described and from the disclosure herein.

The present invention will be explained in more detail in the following with reference to the figures.

DETAILED DESCRIPTION OF EXAMPLE EMBODIMENTS

Figure 1:
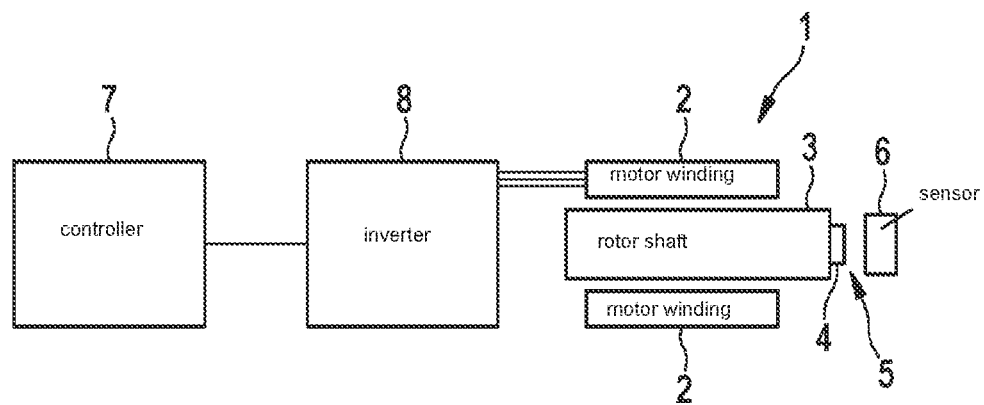
FIG. 1 shows an electric motor with a controller and an inverter, according to an example embodiment of the present invention.

FIG. 1 shows an electric motor 1 comprising a motor winding 2 and a rotor shaft 3, on the front side of which a permanent magnet 4 is disposed. The electric motor 1 is an electrically commutated or brushless electric motor. The electric motor 1 is typically actuated as a function of a power demand with a target rotational speed $n_{target}$ and a target rotational direction for the rotor shaft 3. In the present case, to actuate the electric motor 1, the orientation of a magnetic field 5 of the permanent magnet 4 is detected by an appropriately configured sensor 6, from which an actual angular position $\varphi_{actual}$ of the rotor shaft 3 is ascertained. A controller 7 actuates an inverter 8, which energizes the motor winding 2 as a function of the power demand and an angular position $\varphi$. As a rule, the angular position $\varphi$ corresponds to the actual angular position $\varphi_{actual}$.

Figure 2:
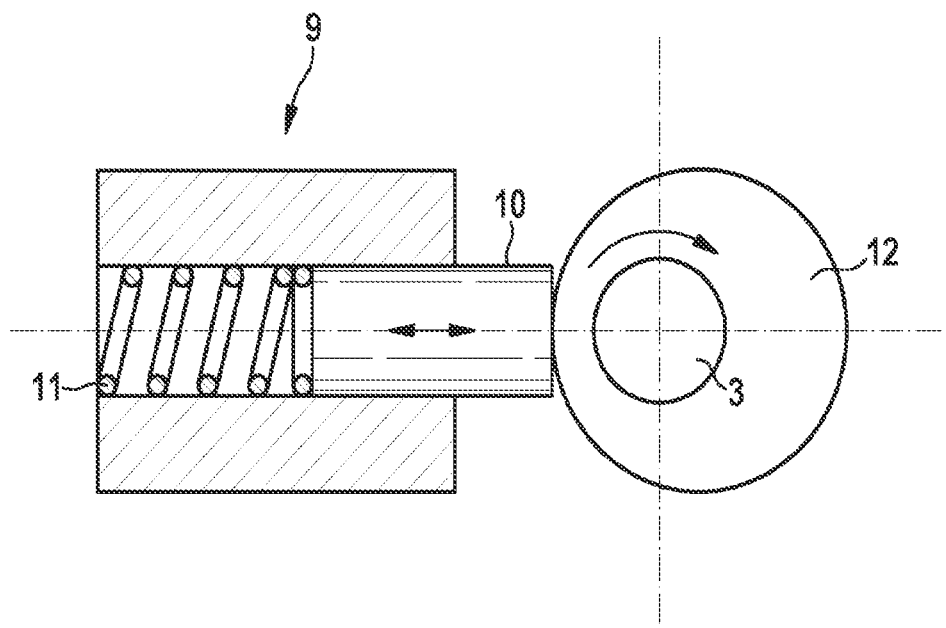
FIG. 2 shows a part of a piston pump according to an example embodiment of the present invention.

FIG. 2 shows a part of a piston pump 9 with a piston 10 and a spring element 11. Said piston pump 9 can in particular be operated to generate hydraulic pressure in a brake circuit of the brake system. The piston 10 of the piston pump 9 abuts a cam 12. The cam 12 is connected to the rotor shaft 3 of the electric motor 1 in a rotationally fixed manner. In the present case, the cam 12 is attached directly to the rotor shaft 3 of the electric motor 1. The cam 12 is configured as an eccentric disk, i.e. it is circular and is eccentrically mounted on the rotor shaft 3. However, it is also possible for the cam 12 to not be attached directly to the rotor shaft 3, but rather to be connected to the rotor shaft 3 in a rotationally fixed manner via a gearing. The rotor shaft 3 rotates about an axis of rotation. The cam 12 converts the rotational movement of the rotor shaft 3 into a translational movement or longitudinal movement of a piston 10 of the piston pump 9. The cam 12 abuts the piston 10 such that the cam 12 exerts a compressive force on the piston 10, as a result of which the displaceably mounted piston 10 is moved in longitudinal direction. This displacement takes place against the spring element 11 and/or the pressure in the brake circuit. When the rotor shaft 3 is rotated further after the piston 10 has been displaced to the maximum extent, the piston 10 moves back in the original direction again because the piston 10 is pressed against the cam 12 by the spring element 11 due to pretension.

Figure 3:
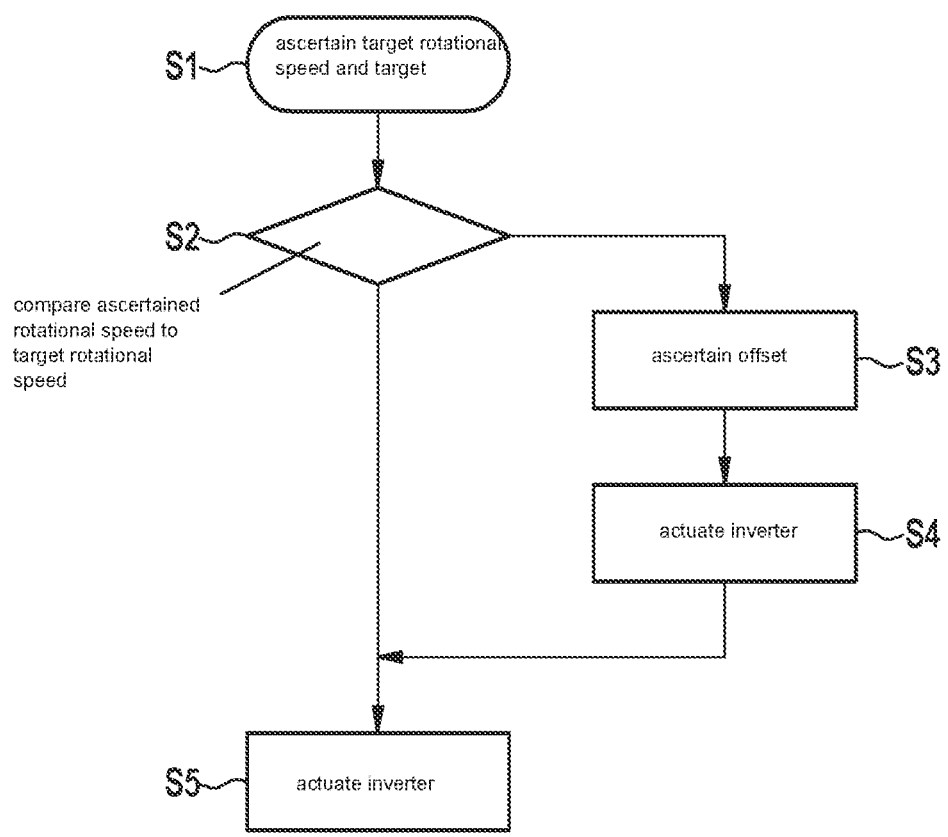
FIG. 3 shows a method for operating the electric motor, according to an example embodiment of the present invention.

One advantageous method for operating the electric motor 1 of the piston pump 9 is described in the following with reference to FIG. 3. For this purpose, FIG. 3 shows the method using a flow chart. The method in particular ensures that a stalled electric motor 1 is identified and that actuation of the piston 10 is enabled again by suitable actuation of the electric motor 1.

In a step S1, the controller 7 ascertains a target rotational speed $n_{target}$ and a target rotational direction for the rotor shaft 3 as a function of a power demand, in particular to achieve a specific pressure or delivery volume of the piston pump 9 in the brake circuit. At the same time, the sensor 6 ascertains the actual angular position $\varphi_{actual}$ of the rotor shaft 3. In a step S2, the controller 7 ascertains an actual rotational speed $n_{actual}$ and compares it with the target rotational speed $n_{target}$. Steps S1 and S2 are carried out continuously.

If the actual rotational speed $n_{actual}$ and the target rotational speed $n_{target}$ are the same, the method is continued with a step S5. However, if the actual rotational speed $n_{actual}$ is equal to zero and the target rotational speed $n_{target}$ is unequal to zero, the electric motor 1 stalls. Then an offset $\varphi_{offset}$ is ascertained in a step S3. This offset $\varphi_{offset}$ is selected such that the rotational direction of the rotor shaft 3 is changed because the motor winding 2 is energized differently than would be the case without the offset $\varphi_{offset}$. The offset $\varphi_{offset}$ therefore causes the motor windings 2 to be energized such that, in the actual angular position $\varphi_{actual}$, this results in the rotor shaft 3 rotating in the opposite direction. The motor windings 2 are thus energized such that the permanent magnet 4 attached to the rotor shaft 3 generates a torque in the changed rotational direction. For the actual angular position $\varphi_{actual}$, which is in particular ascertained from the orientation of the magnetic field 5, the offset $\varphi_{offset}$ is thus determined such that the angular position $\varphi$ as the sum of the actual angular position $\varphi_{actual}$ and the offset $\varphi_{offset}$ results in the advantageous energization of the motor windings 2.

In a step S4, the controller 7 actuates the inverter 8 as a function of the angular position $\varphi$. The angular position $\varphi$ is the sum of the actual angular position $\varphi_{actual}$ and the offset $\varphi_{offset}$ for a specified period of time t. The motor winding 2 is energized in accordance with the power demand, so that the rotor shaft 3 of the electric motor 1 rotates in the opposite direction to the target rotational direction. The specified period of time t is between 2 and 5 milliseconds. By setting the specified period of time t to an interval between 2 and 5 milliseconds, the electric motor 1 is actuated for a sufficiently long period of time so that the rotor shaft 3 actually rotates in the opposite direction to the original target rotational direction. The specified period of time t is also sufficiently short, depending on the rotational speed of the rotor shaft 3, so that the rotor shaft 3 rotates in the changed target rotational direction in particular for only a specific part of a revolution. In step S5, the controller 7 actuates the inverter 8 as a function of the angular position $\varphi$. The angular position $\varphi$ corresponds to the actual angular position $\varphi_{actual}$. The motor winding 2 is energized in accordance with the power demand, so that the rotor shaft 3 of the electric motor 1 rotates in the target rotational direction with the target rotational speed $n_{target}$.

The invention claimed is:

1. A method for operating an electric motor of a piston pump, wherein the electric motor includes a rotor shaft, the method comprising the following steps:
    actuating the electric motor with a target rotational speed and a target rotational direction for the rotor shaft as a function of a power demand;
    monitoring an actual rotational speed of the rotor shaft; and
    changing the target rotational direction, wherein the target rotational direction is changed for a specified period of time when the actual rotational speed is equal to zero and the target rotational speed is unequal to zero, and then actuating the electric motor again at the target rotational speed and in the target rotational direction, wherein, to actuate the electric motor, a motor winding is energized as a function of an angular position of the rotor shaft, and an actual angular position of the rotor shaft is detected and provided with an offset for the specified period of time to determine the angular position therefrom, wherein the offset is selected such that the target rotational direction of the rotor shaft is changed.

2. The method according to claim 1, wherein the specified period of time is between 2 and 5 milliseconds.

3. A controller configured to operate an electric motor of a piston pump, wherein the electric motor includes a rotor shaft, the controller configured to:
    actuate the electric motor with a target rotational speed and a target rotational direction for the rotor shaft as a function of a power demand;
    monitor an actual rotational speed of the rotor shaft; and
    change the target rotational direction, wherein the target rotational direction is changed for a specified period of time when the actual rotational speed is equal to zero and the target rotational speed is unequal to zero, and then actuate the electric motor again at the target rotational speed and in the target rotational direction, wherein, to actuate the electric motor, a motor winding is energized as a function of an angular position of the rotor shaft, and an actual angular position of the rotor shaft is detected and provided with an offset for the specified period of time to determine the angular position therefrom, wherein the offset is selected such that the target rotational direction of the rotor shaft is changed.

4. A piston pump, comprising:
    an electric motor including a rotor shaft, wherein the rotor shaft includes a cam or an eccentric disk;
    a piston of the piston pump abutting the cam or the eccentric disk such that a rotation of the rotor shaft causes a longitudinal displacement of the piston in an axial direction; and
    a controller configured to operate the electric motor of the piston pump, the controller configured to:
        actuate the electric motor with a target rotational speed and a target rotational direction for the rotor shaft as a function of a power demand;
        monitor an actual rotational speed of the rotor shaft; and
        change the target rotational direction, wherein the target rotational direction is changed for a specified period of time when the actual rotational speed is equal to zero and the target rotational speed is unequal to zero, and then actuate the electric motor again at the target rotational speed and in the target rotational direction, wherein, to actuate the electric motor, a motor winding is energized as a function of an angular position of the rotor shaft, and an actual angular position of the rotor shaft is detected and provided with an offset for the specified period of time to determine the angular position therefrom, wherein the offset is selected such that the target rotational direction of the rotor shaft is changed.

* * * * *